(12) United States Patent
Elstermann et al.

(10) Patent No.: US 11,949,929 B2
(45) Date of Patent: Apr. 2, 2024

(54) SYSTEMS AND METHODS FOR DELAY MANIFESTS IN ABR CONTENT DELIVERY

(71) Applicant: ARRIS Enterprises LLC, Suwanee, GA (US)

(72) Inventors: Erik J. Elstermann, Carlsbad, CA (US); Todd T. Kassman, Encinitas, CA (US); Robert L Seymour, La Jolla, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/586,591

(22) Filed: Jan. 27, 2022

(65) Prior Publication Data

US 2022/0239961 A1 Jul. 28, 2022

Related U.S. Application Data

(60) Provisional application No. 63/142,399, filed on Jan. 27, 2021.

(51) Int. Cl.
*H04N 21/242* (2011.01)
*H04N 21/426* (2011.01)
*H04N 21/43* (2011.01)
*H04N 21/6379* (2011.01)

(52) U.S. Cl.
CPC ..... *H04N 21/242* (2013.01); *H04N 21/42607* (2013.01); *H04N 21/4305* (2013.01); *H04N 21/6379* (2013.01)

(58) Field of Classification Search
CPC ........... H04N 21/242; H04N 21/42607; H04N 21/4305; H04N 21/6379
See application file for complete search history.

(56) References Cited

U.S. PATENT DOCUMENTS

| | | | |
|---|---|---|---|
| 11,438,659 B2 * | 9/2022 | Loheide | H04N 21/8456 |
| 2015/0269629 A1 * | 9/2015 | Lo | H04N 21/4532 705/14.66 |
| 2015/0271234 A1 * | 9/2015 | O'Malley | H04L 65/765 709/219 |
| 2015/0296274 A1 * | 10/2015 | Good | H04N 21/8456 725/93 |
| 2022/0150556 A1 * | 5/2022 | Fining | H04N 21/8455 |

OTHER PUBLICATIONS

Anonymous: "DASH-IF implementation guidelines: restricted timing model", Jun. 12, 2020, pp. 1-51, XP055910957, Retrieved from the Internet: URL:https://dashif-documents.azurewebsites.net/Guidelines-TimingModel/master/Guidelines-TimingModel.pdf [retrieved on Apr. 8, 2022] sections 13.6.2 and 13.6.3.
International Search Report and Written Opinion RE: Application No. PCT/US2022/014141, dated Jun. 29, 2022.

* cited by examiner

*Primary Examiner* — Mulugeta Mengesha
(74) *Attorney, Agent, or Firm* — Chernoff, Vilhauer, McClung & Stenzel, LLP

(57) ABSTRACT

Systems and methods for allowing different presentations of a multimedia program, the different presentation delayed relative to each other, by using a delay manifest that includes a sliding window of links to subordinate manifests, and where the subordinate manifests in turn contain links to sequential segments of the multimedia program.

10 Claims, 6 Drawing Sheets

| Channel | Service | Delay (Sec) |
|---|---|---|
| 100 | ABC Live | 0 |
| 101 | ABC 1-Hour Delay | 3600 |
| 102 | ABC 2-Hour Delay | 7200 |
| 103 | ABC 3-Hour Delay | 10800 |

FIG. 5A

Programmer ID = 500

| Channel | Service | Delay (Sec) |
|---|---|---|
| 100 | ABC Live | 0 |

Live IRDs Associated With Programmer ID 500

| Channel | Service | Delay (Sec) |
|---|---|---|
| 100 | ABC 1-Hour Delay | 3600 |

1-hour Delay IRDs Associated With Programmer ID 501

| Channel | Service | Delay (Sec) |
|---|---|---|
| 100 | ABC 2-Hour Delay | 7200 |

2-hour Delay IRDs Associated With Programmer ID 502

| Channel | Service | Delay (Sec) |
|---|---|---|
| 100 | ABC 3-Hour Delay | 10800 |

3-hour Delay IRDs Associated With Programmer ID 503

FIG. 5B

SYSTEMS AND METHODS FOR DELAY MANIFESTS IN ABR CONTENT DELIVERY

CROSS REFERENCE TO RELATED APPLICATIONS

The application claims the benefit of U.S. Provisional Patent Application Ser. No. 63/142,399 filed Jan. 27, 2021.

BACKGROUND

The subject matter of this application relates to Adaptive Bit Rate (ABR) multimedia streaming systems and methods, and in some embodiments to systems and methods that utilize HTTP Live Streaming.

Streaming multimedia over wired and/or wireless networks has become ubiquitous, being readily accessible through the Internet or other network connections such as 4G, Bluetooth, etc. Because any given multimedia content stream may be requested by any one of a variety of devices, such as desktop computers, laptops, cell phones, tablets and so forth, each with its own display capabilities and over network bandwidth of varying quality, adaptive bit rate protocols have been established by which a particular multimedia device may receive streamed content at a quality appropriate for that device and its current network connection quality. For example, an ABR system may provide an on-demand movie to an HD television with a broadband connection to the Internet at 1080p/4300 kbps and 5.1 surround audio while simultaneously delivering the same movie at 480p/1050 kbps and stereo audio to a cell phone connected to the Internet over a 4G service. Alternately, that same cell phone could change from 480p quality to 240p quality, and back again, as bandwidth changes as, say, a user moves among wireless networks of disparate quality.

One particular ABR technology is HTTP Live Streaming (HLS). HLS typically transcodes a particular multimedia presentation into a set of different streams of varying quality (each called a "variant"), where each variant may have a number of components (video, audio, etc.). The presentation is packaged into a number of segments to be delivered and played sequentially by a multimedia player, where each segment is hosted at one or more unique Universal Resource Locators (URLs) and comprises a transport stream file with a .ts file extension. The multimedia content provider then makes the presentation available by publishing two types of manifests. A top-level master manifest uniquely identifies a set of available variant multimedia streams, each of a particular published quality including an overall stream bitrate and a set of codecs used for video and audio, such as AVC for MPEG 4 video and AAC for audio. Each of these multimedia streams is then given a separate media manifest, or playlist, that sequentially identifies the URLs of the segment files or "chunks" that contain the media presentation.

When a user selects a presentation for streaming to a device, that device retrieves the master playlist and selects the media stream having a quality that best matches the capabilities of the device as well as the bandwidth available to the device at that time. From that selection, the media manifest (playlist manifest) associated with that stream is sent to the player, which uses the playlist to sequentially retrieve and display the presentation segments from the URLs listed in the playlist. If conditions change, such that bandwidth drops below a level for acceptable playback of the content, the device can use the master playlist to select a lower quality multimedia stream, access the media manifest associated with that quality, and continue the presentation using the URLs from that manifest.

The playlist manifests are designed to use a sliding playlist window of a relatively short duration, typically on the order of minutes. Within that window are a fixed number of sequentially-ordered URLs, each pointing to a chunk that a client device can download, in order, so as to play the content being streamed. Once the window is full, a URL entering the playlist for a most-recently encoded chunk will displace the oldest URL in the playlist, and so forth.

Oftentimes multimedia content packaged for delivery using an HLS bitstream is intended to delivered to subscribers at different times. For example, the same television broadcast of a program that airs at 8:00 Eastern Standard time in Florida may be broadcast three hours later in California. Existing HLS systems are inefficient at delivering this content; typically the delays involved will dwarf the size of the sliding window, necessitating a different set of manifests/playlist for each time zone in which the same content is broadcast.

What is desired, therefore, is are improved systems and methods that allow the same HLS content to be efficiently broadcast at different times, or delays.

BRIEF DESCRIPTION OF THE DRAWINGS

For a better understanding of the invention, and to show how the same may be carried into effect, reference will now be made, by way of example, to the accompanying drawings, in which:

FIGS. 5A and 5B each show respective channel maps that may be used to access the content of FIGS. 3 and 4 at different delays.

DETAILED DESCRIPTION

As previously noted, HLS typically allows a content server to publish master and media manifest files for access by client devices. A master manifest file identifies multiple sets of video streams, or variants, for a media program such as a movie, a television program, etc., where each set of variants has unique encoding parameters (e.g., bit rates, resolutions, etc.) for the media program. The client devices may dynamically switch between the sets of variants identified in the master manifest file as the multimedia stream is transmitted from a content server to the client devices. The client devices may choose to receive an initial variant identified in the master manifest file based on initial network conditions, initial buffer conditions, etc. For example, the client devices may choose to receive a high definition presentation identified in a master manifest file if the initial network conditions, the initial buffer conditions, etc., support the streaming of high definition content. If those initial network conditions degrade, or if the initial buffer conditions degrade, etc., then the client devices may choose to receive a lower resolution presentation identified in the master manifest file. That is, the client device may dynamically choose different sets of variants to receive from the content server, where the different variants have different encoding parameters.

In some systems, those of ordinary skill in the art will recognize that it is not always necessary to provide consumers with varying levels of quality, yet it may still be beneficial to stream content to customers using the HLS standard. For example, in systems where quality can be assured, a single high-quality stream may be provided by a single media playlist. The disclosure herein will be described using such a system where media content is streamed at only a single available quality, but those of ordinary skill in the art will appreciate that the systems and methods described herein may be readily modified to incorporate different variant streams at different qualities.

Figure 1:
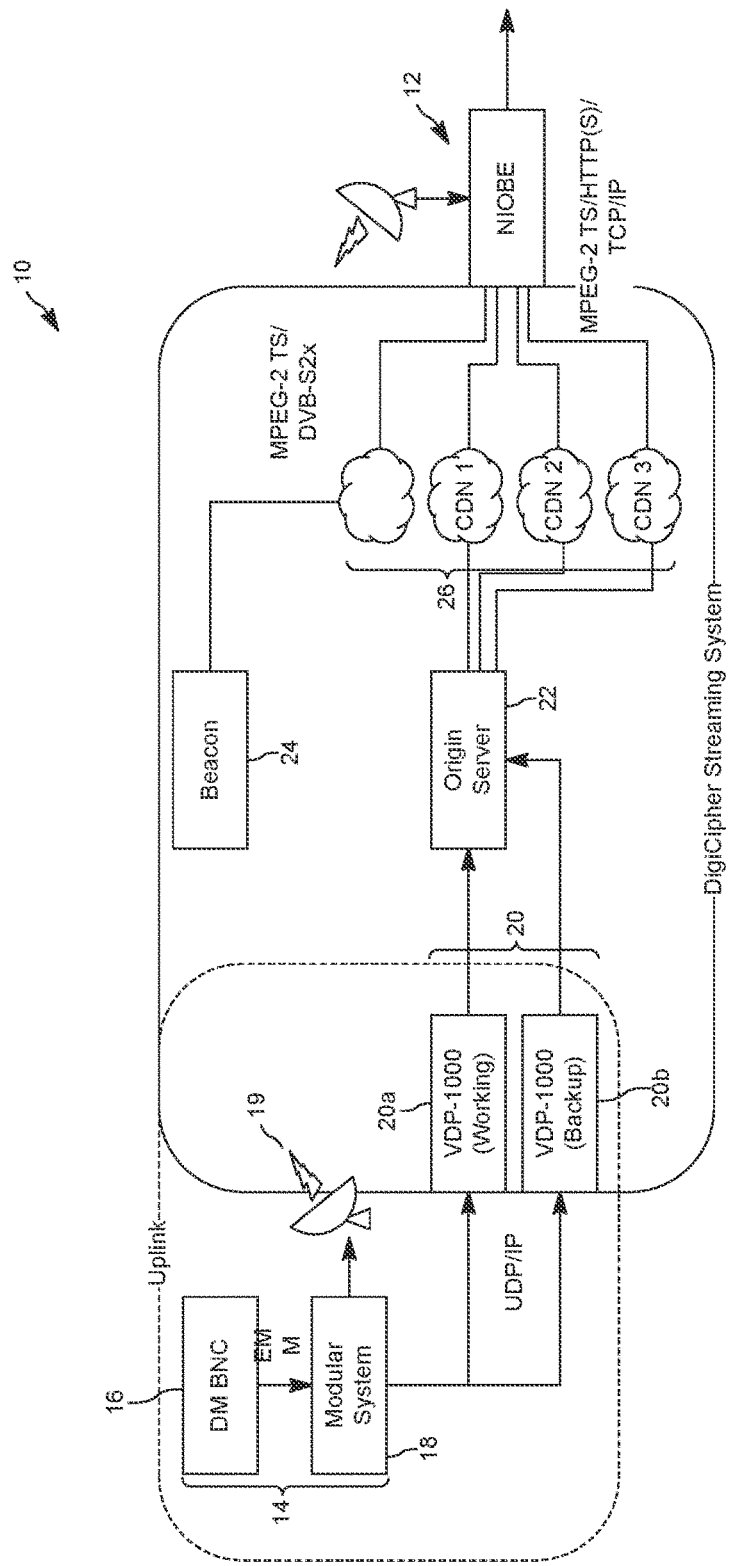
FIG. 1 shows an exemplary system capable of providing HLS content according to the disclosure of the present application.

Referring to FIG. 1, a system 10 suitable to stream HLS content in accordance with the disclosure herein may include an Integrated Receiver/Decoder 12 that receives content from a modular video encoding system 14 that may include a decoder manager 16 and one or more encoding modules 18. The one or more encoding modules typically receive input multimedia stream, compress it, encrypt it, multiplex it, or perform any other desired operation on the bitstream, prior to delivery to satellite 19 and/or video distribution packagers 20a, 20b, etc. The decoder manager 16 may preferably act as a master controller for all IRDs in the system 10.

The multimedia stream, after being processed by the modular video encoding system 14 may be forwarded to each of several redundant Video Distribution Packagers (VDPs) 20, e.g. VDP 20a, VDP 20b, etc. The VDPs 20 package the content to conform to networks that support the HLS specification, i.e. the VDPs 20 segment the multimedia stream into chunks, assign URLs to the chunks, construct the media manifests and other manifests as herein described, and thereafter provide the content to origin server 22. To access the content published on the origin server 22, the IRD 12 may first retrieve information from server 24 indicating to the IRD 12 which CDNs 26 through which the origin server 22 may be accessed. The IRD 12 may then receive and decode the multimedia content.

Preferably, the system shown in FIG. 1 implements a protocol following the HTTP Live Streaming standard, and is preferably configured to broadcast-quality content delivery through NTP (Network Time Protocol) synchronization of Video Distribution Packagers and Integrated Receiver Decoders. Preferably, the system shown in FIG. 1 is interoperable with existing modular uplink systems so as to allow seamless transition between traditional satellite and IP distribution.

Figure 2:
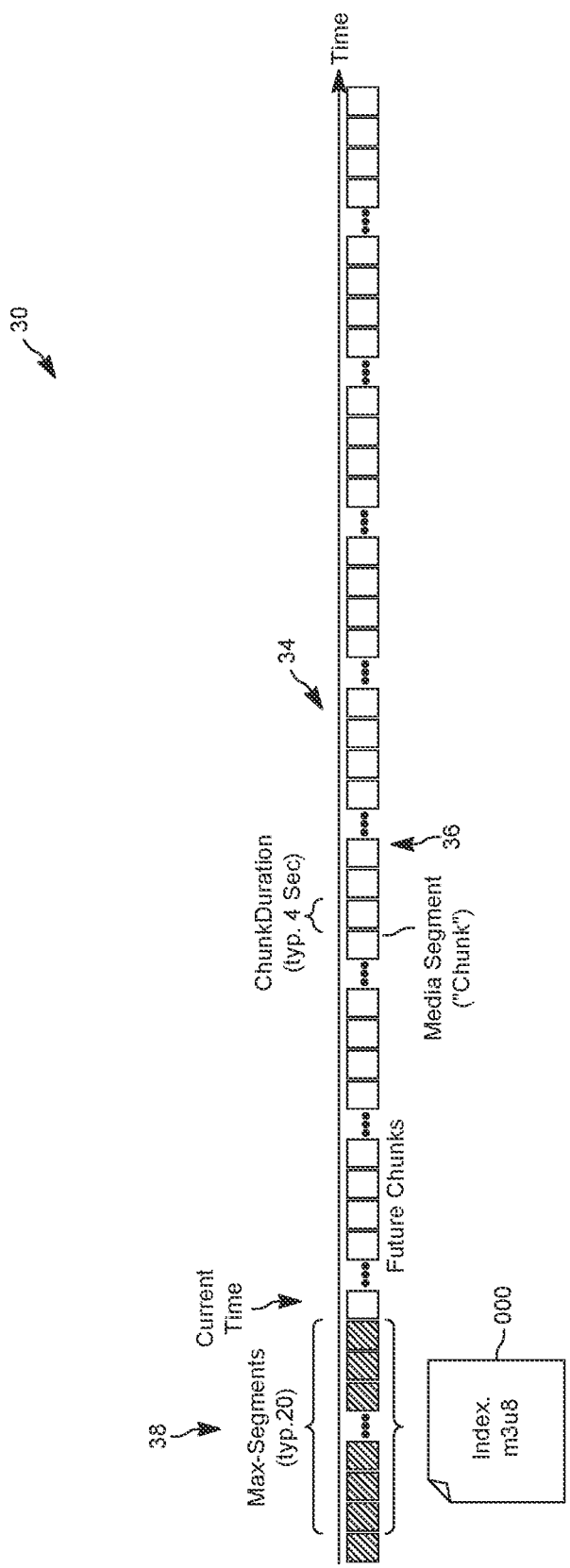
FIG. 2 shows the operation of an exemplary live manifest, used for example in the system of FIG. 1, to implement a sliding window of URLs pointing to sequential chunks of content.

FIG. 2 generally shows an implementation 30 of an exemplary HLS media manifest 32 as it indexes a continuous stream 34 of media segments or chunks 36. The media manifest 32 may be an index to a sliding window 38 (a buffer) of chunks 36, One typical implementation provides that the media manifest is an index.m3u8 file that 32 indexes a sliding window of 20 chunks, each having a duration of 4 seconds, meaning that the media manifest contains information on URLs pointing to the most recent 80 seconds of a media stream provided via an HLS broadcast. A media manifest capable of implementing the systems and methods disclosed herein may have the following form.

EXTM3U
EXT-X-VERSION:4
EXT-X-MEDIA-FORMAT:2
EXT-X-TARGETDURATION: 4
EXT-X-MAX-SEQUENCE:23860
EXT-X-MEDIA-SEQUENCE: 9096
EXT-X-PROGRAM-DATE-TIME:2021-01-12T17:54:20
EXTINF:3.962,9096
982368333499.ts
EXT-X-PROGRAM-DATE-TIME: 2021-01-12T17:54:24
EXTINF:3.956,9097
982476598382.ts
EXT-X-PROGRAM-DATE-TIME: 2021-01-12T17:54:28
EXTINF:3.965,9098
982584602569.ts
. . .
EXT-X-PROGRAM-DATE-TIME:2021-01-12T17:55:36
EXTINF:3.957,9115
984420134324.ts

Once the media manifest is fully populated to its maximum size of segments, at any current time, as a new encoded chunk is packaged the media manifest is updated to list a URL. In the media manifest sequence identified in the previous paragraph, the URL is identified by the string with the .ts extension, where that string is simply the terminal end of a URL, the remaining portion of which is already known to the IRD, i.e. the IRD only needs to update the URL with the new string identified in the media manifest for that chunk. As the new URL is added, however, the oldest URL in the media manifest 32 is removed.

The implementation shown in FIG. 2 is not be ideal when a media program is broadcast in multiple locations, at different delays relative to each other. As noted earlier, because the media manifest 32 is a sliding window of short duration, that manifest cannot be easily used for content delayed beyond the temporal span of the window.

Figure 3:
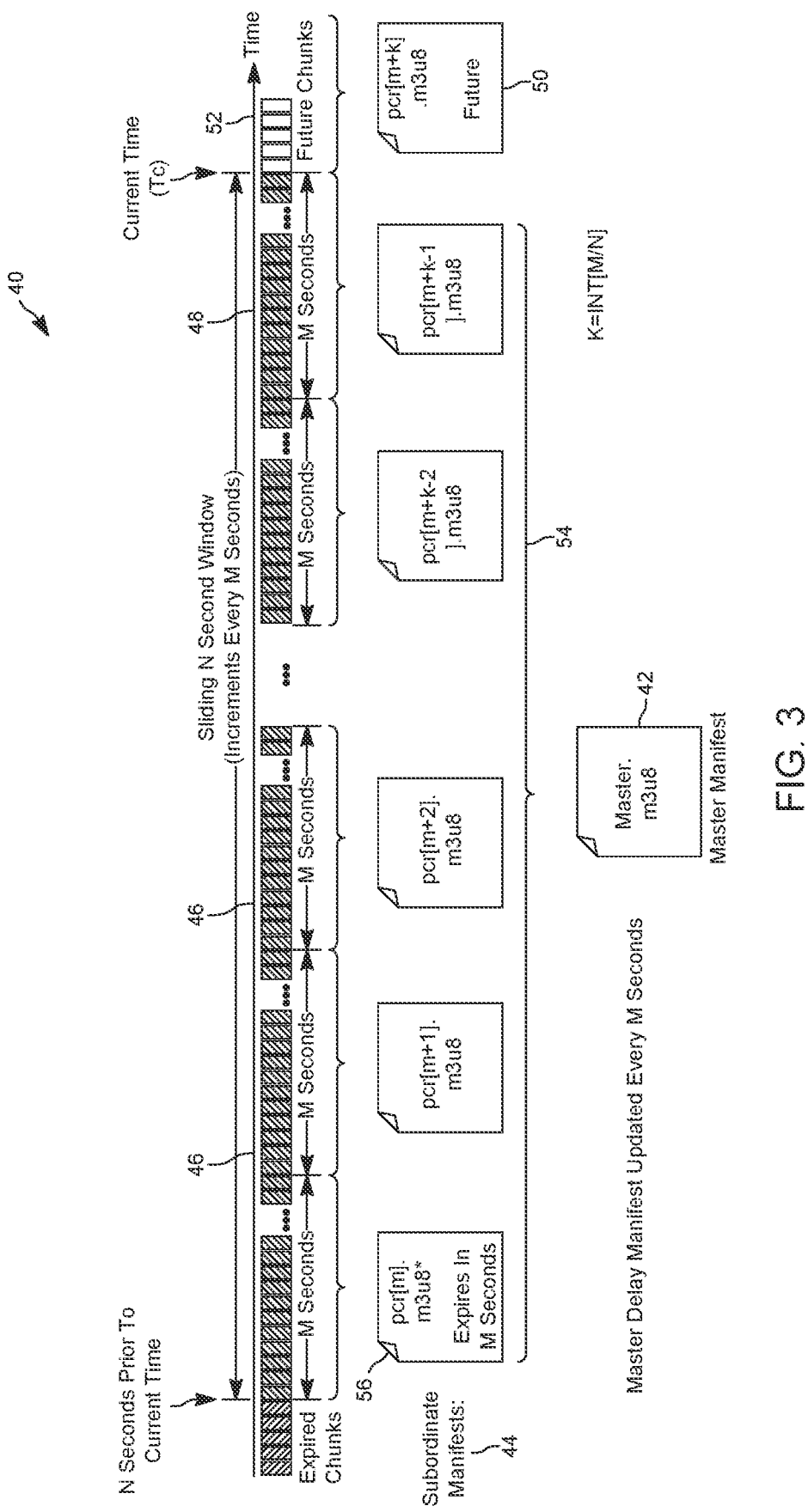
FIG. 3 shows an alternative operation of an exemplary delay manifest, used for example in the system of FIG. 1, to implement a sliding window of URLs pointing to sequential chunks of content that permits the content to be broadcast multiple times at different delays.

FIG. 3 shows an alternate implementation 40 that includes a novel delay manifest 42, which is a single manifest that allows a media stream to be decoded and provided to viewers at any one of an arbitrary number of delay intervals. Specifically, the delay manifest 42 may index, indirectly through subordinate manifests 44 as described later, a sequence of multimedia chunks 46 spanning a sliding window 48 of interval "N." For example, for a value of N=10800 seconds, a delay manifest 42 would allow a broadcast at a maximum three-hour delay. Sliding windows of longer duration could permit rebroadcast with even longer delays, which might be needed for example to broadcast content shown in both Florida and Hawaii, for example. In some embodiments, the delay manifest may be implemented in a file with an .m3u8 extension, e.g., delay.m3u8 etc.

Rather than referencing URLs to packaged chunks of video, the delay manifest 42 references links to a plurality "K" of subordinate manifests 44. Each of the subordinate manifests 44 is another .m3u8 file that in turn references the URLs to packaged chunks of video. Each subordinate manifest 44 is a file or document that links to media segments comprising a preferably uniform portion of the sliding window 48. For example, if each subordinate manifest spans a 10-minute (600 second) sub-window M of a sliding window of a 3-hour duration, there would be K=18 subordinate manifests—i.e. 10800 seconds/600 seconds).

The delay manifest 42 may comprise a file structured as follows, where subordinate manifests are added at the bottom of the list and move upwards as more subordinate manifests are added:

EXTM3U
EXT-X-STREAM-INF:PROGRAM-DATE-
    TIME=2021-01-12T15:17:56
729000393287.m3u8
EXT-X-STREAM-INF:PROGRAM-DATE-
    TIME=2021-01-12T15:27:56
745200367731.m3u8
EXT-X-STREAM-INF:PROGRAM-DATE-
    TIME=2021-01-12T15:37:56
761400082464.m3u8
EXT-X-STREAM-INF:PROGRAM-DATE-
    TIME=2021-01-12T15:47:56
777600418382.m3u8
EXT-X-STREAM-INF:PROGRAM-DATE-
    TIME=2021-01-12T15:57:56
793800358241.m3u8
. . .
EXT-X-STREAM-INF:PROGRAM-DATE-
    TIME=2021-01-12T18:17:56
1020600200019.m3u8
EXT-X-STREAM-INF:PROGRAM-DATE-
    TIME=2021-01-12T18:27:56
1036800155747.m3u8 and the subordinate manifest 44 may have the form
EXTM3U
EXT-X-VERSION:4
EXT-X-MEDIA-FORMAT:2
EXT-X-TARGETDURATION: 4
EXT-X-MAX-SEQUENCE:23860
EXT-X-MEDIA-SEQUENCE:9450
EXT-X-PROGRAM-DATE-TIME:2021-01-12T18:17:
    56
EXTINF:3.964,9450
1020600200019.ts
EXT-X-PROGRAM-DATE-TIME:2021-01-12T18:18:
    00
EXTINF:3.957,9451
1020708463397.ts
EXT-X-PROGRAM-DATE-TIME: 2021-01-12T18:18:
    04
EXTINF:3.943,9452
1020816739308.ts
. . .
EXT-X-PROGRAM-DATE-TIME:2021-01-12T18:27:
    48
EXTINF:3.956,9598
1036584277220.ts
EXT-X-PROGRAM-DATE-TIME:2021-01-12T18:27:
    52
EXTINF:3.929,9599
1036692550624.ts In a preferred embodiment, for reasons explained later in this specification, the subordinate manifests are identified using a filename based on the Program Clock Reference (PCR) value of the first frame of the video sequences they include. Thus, as can be seen in the example file structures in the preceding paragraph the bold material in the master manifest 0025 references the link 1020600200019.m3u8 to the subordinate manifest, which in turn links to chunks 1020600200019.ts to 1036692550624.ts.

Referring still to FIG. 3, each subordinate manifest 44 indexes an "M" second window of the sliding window "N." The subordinate manifests therefore themselves together comprise a sliding window, where each subordinate manifest 44 in essence moves to the left every "M" seconds. For example, at any given current interval "M," a next-sequential subordinate manifest 50 to be added will be constructed so as to index future chunks 52. At the end of the current interval M, that subordinate manifest 50 will be added to the sliding window 54 of subordinate manifests, and subordinate manifest 56 will slide out of the window (i.e., expire). At the same time, the subordinate manifest 56 will move out of the sliding window 54, i.e. it will no longer be referenced by the delay manifest 42.

As can be easily appreciated from the architecture shown in FIG. 3, multiple different delayed presentations of multimedia content may be effectuated through the delay manifest 42. Specifically, an IRD 12 as shown in FIG. 1 simply needs to be instructed by the server 24 which specific location in the delay manifest 42 corresponds to the delay relative to the original media presentation. As time passes, and the next sequential M-seconds of chunks are encoded into a new subordinate manifest, the new manifest will enter into the sliding window 54, each subordinate manifest 44 will incrementally shift in the sliding window, the delay manifest will accordingly be updated, and the same location that the IRD 12 was directed to in the delay manifest will now point to the next sequential series of chunks it is intended to decode. Accordingly, in the sliding window 54 of subordinate manifests, there will be numerous potential delay positions created by the respective subordinate manifests 44 for presentations of different delays, although in ordinary implementations it is expected that IRDs will only be pointed to a small subset of the available delays, e.g., three hours, five hours, etc.

Figure 4:
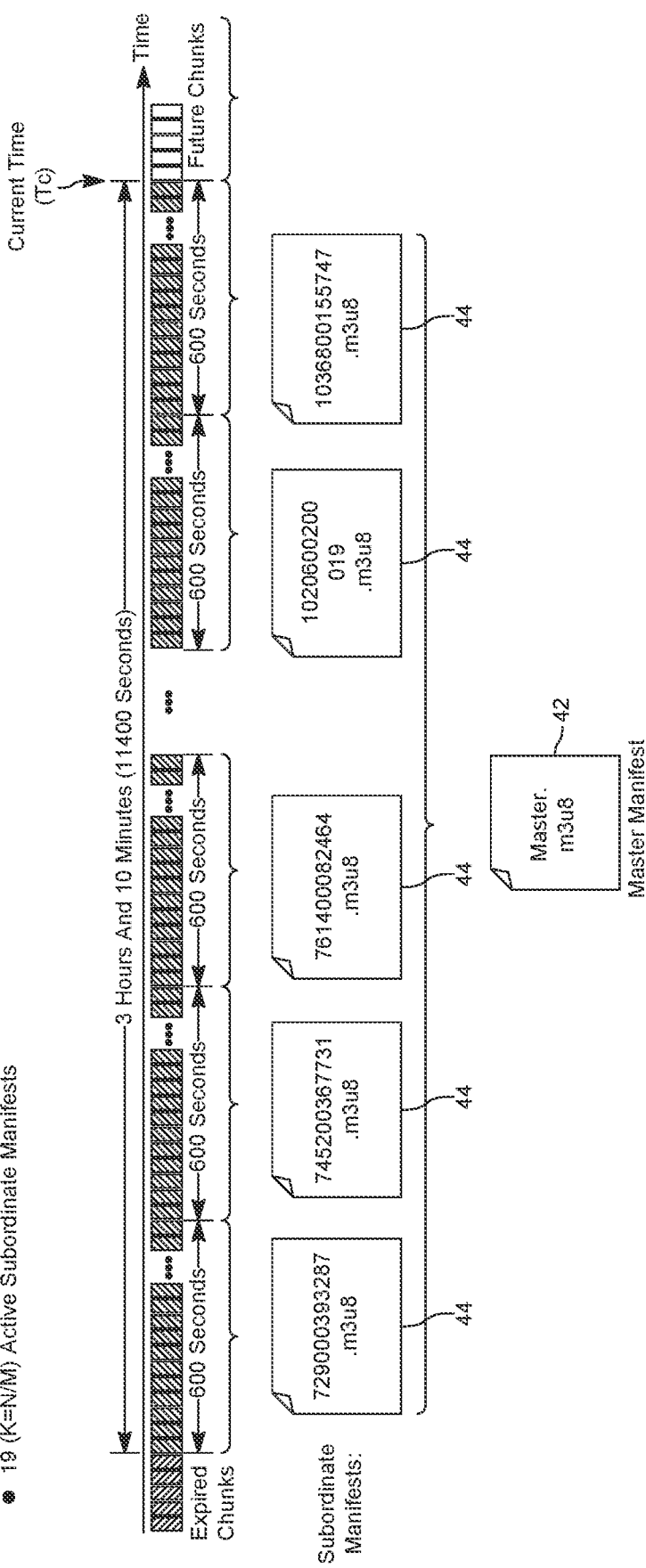
FIG. 4 shows an example of the operation of FIG. 3 implementing a delay of up to three hours.

FIG. 4, for example, shows an implementation that allows up to a three-hour delay, where each subordinate manifest spans a 10-minute (600 second) sub-window, where the total delay window is 3 hours and 10 minutes, meaning that there are 19 active subordinate manifests. Assume, for purposes of this illustration, that a media presentation is intended to be presented live, and also presented on one-, two-, and three-hour delays. When the presentation begins, a live manifest is created as described earlier in the specification with respect to FIG. 2, where there is no associated delay (delay 0), and this live manifest is also converted/encoded as a subordinate manifest 44 that is added to the sliding window. The delay manifest 42 may be updated every 10 minutes as described earlier, such that if desired a 10-minute delay may be implemented by an IRD pointing to the first subordinate manifest added at the bottom of the delay manifest. After an hour passes, a first IRD 12 may be directed to the position in the delay manifest 42 seventh from the bottom, representing the delay of an hour, i.e., the seventh subordinate manifest added to the sliding window. That IRD 12 may continue to decode the delayed presentation by continually processing the subordinate manifests linked to at this position in the delay manifest 42.

After another hour passes, a different, second IRD 12 may be directed to the 13$^{th}$ subordinate manifest 44 added to the delay manifest 42 (seventh from the top), which is the same subordinate manifest that, an hour earlier, was accessed by the first IRD 12. Again, the second IRD 12 may continue to decode the presentation on a two-hour delay by being linked to subordinate manifests sliding into this position in the delay manifest. Similarly, a third IRD 12 may decode a presentation on a 3-hour delay by being directed to the linked subordinate manifest 44 at the top of the delay manifest 42.

Thus, in some embodiments, an IRD fetches manifests as specified by the server 24 shown in FIG. 1. For live content, the live manifest (index.m3u8) is specified as described earlier in the specification, and thereafter uses media segments specified by the live manifest. For delayed content, the master manifest 42 is specified, and thereafter the IRD 12 obtains subordinate manifests 44 and associated media segments based on a delay specified by server 24. In some embodiments, as shown in FIG. 5A for example, multichannel IRDs may support mixed live/delayed content. In such an embodiment, the IRD may switch between live or delayed content (or among content with different delays) through a channel change commanded by the programmer through decoder manager 16. For example, channel 100 may be a live version of a program while channel 200 is a delayed version. Alternatively, channel 100 associated by a channel map in server 24 with be with programmer ID "x" may display live content, while channel 100 associated with programmer ID "y" in server 24 may display delayed content. FIGS. 5A and 5B show these alternative implementations of channel maps by which channels may show content at various delays. For example, in the implementation of FIG. 5A, different ABC channels in a line-up decoded by the same IRD may show the same content, but delayed by different intervals. In the implementation of FIG. 5B, different IRDs may decode the same channel at different delays.

In some preferred embodiments, regardless of delayed content playout configuration, IRD command and control is provided via a separate, dedicated "live" control stream (manifest and media segments) to ensure prompt authorization and configuration by the programmer/uplink.

As noted earlier, in a preferred embodiment, the subordinate manifests 44 are preferably identified by the Program Clock Reference (PCR) value of the first frame of the video sequences they include. Referring again to FIG. 1, it is preferable to include redundant VDPs 20*a*, 20*b*, etc. in case of network or hardware failures. In the instance of such a failure, however, it would ordinarily be difficult for a redundant VDP to seamlessly provide content to manifest files because the VDPs may not be synchronized relative to each other. By using the PCR values as just described, such synchronization is guaranteed, because each corresponding subordinate manifest 44 will begin at the same point in the presentation, and be identified by the same name.

Also as noted earlier, although the foregoing description assumed that only one quality, or variant, was provided of a program, the systems and methods described in this specification may easily be incorporated into a typical adaptive bitrate scheme having a master manifest pointing to variant bitrate manifests. In this embodiment, the master manifest may list a number of variant bitrate streams as it typically does, but each optional variant may in turn link to a delay manifest as herein described.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A packager that receives a bitstream encoding a multimedia presentation, the packager having a processing device configured to:
   segment the bitstream into a plurality of chunks, and associate each chunk with a respectively different first network address by which each chunk may be accessed by a decoding device;
   sequentially create a plurality of first manifests that each include a respectively different subset of the first network addresses associated with the chunks segmented by the packager;
   associate each first manifest with a respectively different second network address; and
   populate a second manifest with the respectively different second network addresses, where the second manifest is capable of retaining a limited number of the second network addresses; where
   once the second manifest is fully populated, the packager is configured to remove the oldest second address remaining in the second manifest whenever a newest second address is added to the second manifest.

2. The packager of claim 1 configured to assign a network address to the second manifest.

3. The packager of claim 1 configured to deliver the plurality of chunks, the plurality of first manifests, and the second manifest to an origin server.

4. The packager of claim 1 where respective names of the first manifests are each based on a characteristic of the chunks associated with the first address added to the subordinate manifest.

5. The packager of claim 4 where the characteristic is a Program Clock Reference.

6. A server communicating with at least one decoding device, and communicating with an origin server storing a first manifest containing links to a plurality of second manifests, the server configured to:
   respond to a request at a first time from a first one of the at least one decoding device for receipt of a multimedia presentation, beginning from a fixed point in the multimedia presentation, by communicating to the first one a link to the first manifest and a first position in the first manifest; and
   respond to a request at a second time from a second one of the at least one decoding device for receipt of the multimedia presentation, beginning from the fixed point in the multimedia presentation, by communicating to the second one a link to the first manifest and a second position in the first manifest.

7. The server of claim 6 where the first position in the first manifest corresponds to a respective one of the second manifests.

8. The server of claim 7 where the second position in the first manifest corresponds to the respective one of the second manifests.

9. The server of claim 6 where the server of claim 1 configures to respond to a request from the at least one decoding device for a live broadcast of the at least one multimedia presentation with a link to a third manifest.

10. The server of claim 6 where the third manifest includes links to a plurality of encoded segments of the media presentation.

\* \* \* \* \*